April 9, 1929. O. M. TUCKER ET AL 1,708,037
METHOD AND APPARATUS FOR DELIVERING VISCOUS GLASS
Original Filed Aug. 12. 1918
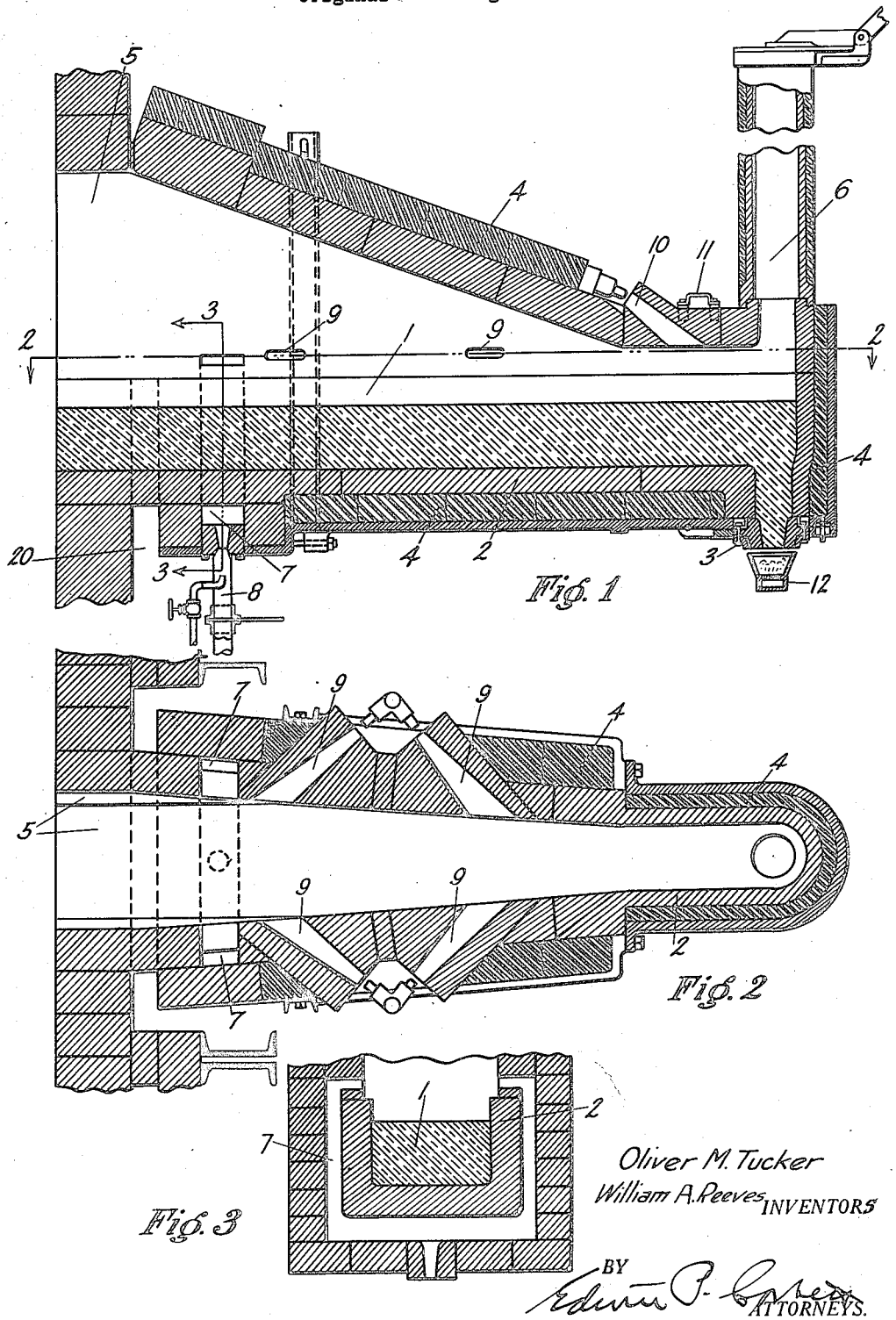
Oliver M. Tucker
William A. Reeves INVENTORS
BY
ATTORNEYS.

Patented Apr. 9, 1929.

1,708,037

UNITED STATES PATENT OFFICE.

OLIVER M. TUCKER AND WILLIAM A. REEVES, OF COLUMBUS, OHIO, ASSIGNORS, BY MESNE ASSIGNMENTS, TO HARTFORD-EMPIRE COMPANY, OF HARTFORD, CONNECTICUT, A CORPORATION OF DELAWARE.

METHOD AND APPARATUS FOR DELIVERING VISCOUS GLASS.

Original application filed August 12, 1918, Serial No. 249,421. Divided and this application filed October 15, 1924. Serial No. 743,716.

Our invention relates to a method and apparatus for delivering viscous glass. It has particular reference to such a spout in connection with a glass furnace, being primarily designed to meet certain requirements in the production of en bloc charges preformed as to shape and dimensions and the dropping and settling of such charges right side up in the molds where they are to be further treated.

Others have devised spouts which deliver viscous glass from furnace to mold and others have provided means for heating the glass in such spouts. But, the production of preformed charges and the proper deposit thereof calls for certain accuracies that are only attainable by special measures of control. For instance, glass being delivered through a spout frequently develops strata of different temperatures and, if this condition persists in the glass being actually delivered from the delivery orifice of the spout, the charges curve, because one side is colder than the other or will be otherwise of uneven consistency. Then, the curved charges do not properly settle in their molds and the uneven consistency prevents proper subsequent treatment, as by blowing thin, et cetera. These are merely examples of numerous defects due to improper temperature control. Our invention contemplates providing a spout which is thoroughly insulated and then equipping such spout with means whereby the temperature of both the spout interior and the glass may be efficiently regulated.

Thus, regardless of variations in furnace conditions, we have devised apparatus for delivering charges of viscous glass of chosen quantity, quality and uniformity. In this way, we have taken the handling of glass one step further away from formerly existing limitations inherent in the problem of extracting viscous glass from furnaces whose internal conditions are inevitably ever-changing.

This application is a division of our copending application, filed August 12, 1918, Serial No. 249,421, a method and apparatus for delivering viscous glass.

The preferred embodiment of our invention is shown in the accompanying drawings wherein:

Figure 1 is a longitudinal section of a spout structure embodying our invention, shown applied to a furnace.

Figure 2 is a section taken on line 2—2 of Figure 1.

Figure 3 is a partial section, taken on the line 3—3 of Figure 1.

The top, bottom, sides and ends of the spout 1 are thoroughly insulated as at 4.

We have provided several means, additional to the insulation, for controlling the internal temperature of the spout and the temperature of the glass at different points in such spout. In the first place, both the channel and the hood of the spout are enlarged at their receiving end, as at 5. This facilitates inlet of the glass and the heat currents from the glass furnace. More important, still, the wide channel for the glass results in slow movement of the glass at this point and it will appear that we utilize this condition for temperature regulation before the glass passes into the heavily insulated narrow channel. Thus, before the glass reaches the delivery orifice where it has a more rapid movement, it has ample time for the heated and chilled strata to diffuse and bring about the delivery of charges of any desired uniform temperature and consistency. From its wide portion, the spout tapers toward its delivery end where it is provided with a valve-controlled draft flue 6 lined with refractory and insulating material and leading out of the top of the spout nose to assist in drawing the heat currents from the furnace through the spout, above and in direct contact with the glass in such spout. Thus the glass passes through the spout with a minimum amount of wall friction and the heat currents are readily controlled.

The walls of the spout are provided with a channel which is shown at 7 as extending around three sides of the spout adjacent the juncture of the spout with the furnace and which may be fed with a heating or cooling fluid from below as at 8. In the form shown these channels deliver into the space 5 (Fig. 1) and the heating or cooling fluid, preferably a gas may be so delivered as to commingle with the heat currents from the furnace so as to directly modify the effect of such currents upon the glass and wall surfaces and, in time, to modify the effect of the wall surfaces upon the glass. It is obvious that the channel 7 may be ramified to various points in the walls of the spout. However, it is an important fact of our invention that we positively influence the temperature of the glass to a regulable degree very near the moment when it enters the spout, thereby giving ample opportunity for diffusion of the impressed temperature during the time the glass travels through the long narrow tapering spout to the delivery orifice.

It is likewise of considerable importance that the outer lining around the channel blocks 2 is spaced from the furnace wall as at 20. This is an important structural feature, due to the fact that there is a tendency for the glass in the furnace to destructively erode and seep through the joints between an insulated furnace wall and the channel blocks. If the channel 7 abutted the furnace wall this tendency would eventually result in filling up the channel 7 with glass and thus rendering it inoperative. But with the space 20, the outer surfaces of the furnace wall and the joints at the points in question are chilled by the atmosphere sufficiently to prevent destructive erosion of the wall blocks and leakage and, even if any slight leakage occurs, the glass will merely drip down onto the floor, since it cannot reach the channel 7.

In addition the spout is provided, in its walls, with ports 9 that are preferably oblique and which are so located as to make possible the direct application of heating or cooling blasts to any area above the upper surface of the glass in the spout. Furthermore, there is provided a port 10 in the top of a lid 11 of the spout nose, this port permitting the application of either a heating or cooling blast within such nose and adjacent the delivery orifice. The lid is particularly desirable because it is removable to give ready access to the glass in the spout.

Thus, the temperature of the glass and spout walls at every point is under positive control and this control is so complete that the glass may be brought to the delivery orifice at any desired uniform consistency and at any rate of movement within chosen limits.

In addition, we have a means for intermittently stopping feed of the glass from the delivery orifice of the spout, which means takes the form of a cup 12 movable into and out of closing relation to the bottom end of the spout orifice. When in position, gas under pressure is fed to the cup and burned therein while the cup is closed with the exception of an extremely small outlet for the products of combustion, so that an intense heat is applied to the clay bushing 3.

From this it will be seen that the glass in the spout is subject to complete temperature control, from the moment it enters until it leaves the spout. In our method, these temperature controls are desirably utilized to insure a uniform temperature and rate of movement at the delivery orifice. A large part of the uniformity of temperature and rate of movement is attributable to the insulation upon the spout, for it greatly enhances surety of control, although the various features of control are all important.

Having thus described our invention, what we claim is,—

1. Apparatus for delivering viscous glass from a furnace comprising a long narrow spout having a flow channel formed to be wider at its intake end than elsewhere along its length, said flow channel having a discharge orifice, means for regulating the temperature of the glass as it leaves the furnace and passes into the relatively wide inlet of the spout and means for applying a confined flame burning under pressure to the walls of the orifice and to the glass in said orifice.

2. Apparatus for delivering viscous glass from a furnace comprising a spout with a delivery orifice therein, means for regulating the temperature of the glass as it leaves the furnace and passes into the spout and means for applying a confined flame burning under pressure to the walls of the orifice of said spout.

3. A spout for delivering viscous glass from a furnace comprising a body portion having a delivery orifice therein, said body portion being insulated practically throughout, means for directing a heating flame along the surface of the glass within the spout, and means beneath the orifice for heating the walls thereof by the application of a confined flame thereto.

4. A spout for delivering viscous glass from a furnace comprising a body portion having a delivery orifice therein, said body portion being insulated practically throughout, and means for applying an enclosed gas burning under pressure to the orifice of said spout.

5. The method of conditioning molten glass for use in glassware fabricating apparatus, which comprises flowing the glass from a melting tank through a spout having a long tapering flow channel and having a discharge orifice in the forward end thereof, subjecting the flowing glass to a temperature-modifying fluid applied within the spout, and applying an enclosed flame to the walls of the orifice and to the glass in said orifice.

6. The method of conditioning molten glass for use in glassware fabricating apparatus, which comprises flowing the glass from a melting tank through a spout having a long tapering flow channel and having a downwardly opening discharge outlet in the forward end thereof, subjecting the flowing glass to a temperature-modifying fluid applied within the spout, and subjecting the said outlet to a confined heating flame applied from beneath.

7. The method of conditioning molten glass flowing from a glass melting tank, which comprises providing an insulated spout having a flow channel therein and a discharge outlet at the forward end thereof, subjecting the glass to a temperature-modifying medium as it passes from the furnace to the spout channel, subjecting the glass in the channel at the discharge outlet to another temperature-modifying medium, and subjecting the exterior walls of the discharge outlet to a confined heating flame applied beneath the outlet.

8. The method of conditioning molten glass flowing from a glass melting tank, which comprises providing an insulated spout having a flow channel therein and a discharge outlet at the forward end thereof, subjecting the glass and the walls of the spouts to a temperature-modifying medium, directing a heating medium to the surface of the glass adjacent to the outlet, and periodically applying to the outlet a confined flame burning under pressure.

In testimony, whereof, we hereby affix our signatures.

OLIVER M. TUCKER.
WILLIAM A. REEVES.